US009488893B2

(12) United States Patent
Bernhardt

(10) Patent No.: US 9,488,893 B2
(45) Date of Patent: Nov. 8, 2016

(54) ACTIVE FINISH SYSTEM FOR PROVIDING AN IMAGE ON A SURFACE

(71) Applicant: The Boeing Company, Chicago, IL (US)

(72) Inventor: Roger D. Bernhardt, O'Fallon, MO (US)

(73) Assignee: THE BOEING COMPANY, Chicago, IL (US)

(*) Notice: Subject to any disclaimer, the term of this patent is extended or adjusted under 35 U.S.C. 154(b) by 213 days.

(21) Appl. No.: 14/475,283

(22) Filed: Sep. 2, 2014

(65) Prior Publication Data

US 2016/0062205 A1  Mar. 3, 2016

(51) Int. Cl.
*G02F 1/167* (2006.01)
*G02F 1/19* (2006.01)

(52) U.S. Cl.
CPC ............. *G02F 1/167* (2013.01); *G02F 1/19* (2013.01); *G02F 2001/1678* (2013.01)

(58) Field of Classification Search
CPC ................................. G09G 3/20; G02F 1/19
See application file for complete search history.

(56) References Cited

U.S. PATENT DOCUMENTS

| 6,118,426 A * | 9/2000 | Albert | B41J 2/01 315/150 |
| 6,323,989 B1 * | 11/2001 | Jacobson | B41J 2/01 345/107 |
| 2010/0032001 A1 * | 2/2010 | Brantner | H01L 31/022425 136/244 |

OTHER PUBLICATIONS

Kagan, C.R., et al., "Electronic Energy Transfer in CdSe Quantum Dot Solids", Phys.Rev.Lett, 76(9), 1517-1520(1996).*

* cited by examiner

*Primary Examiner* — Olga Merkoulova
(74) *Attorney, Agent, or Firm* — MH2 Technology Law Group LLP

(57) ABSTRACT

An apparatus and method for an electronically activated grouping of charged particles for providing a changeable image on a surface is disclosed and claimed herein. The apparatus can include a capsule containing a plurality of first reflectance-type charged particles suspended in a dielectric fluid. Attached to the capsule can be a first rectenna having dipole elements attached to the capsule and conductively coupled to the capsule to effect switching of the plurality of first reflectance-type charged particles between a substantially visible state to a substantially non-visible state when a signal having the first rectenna's wavelength is received.

19 Claims, 3 Drawing Sheets

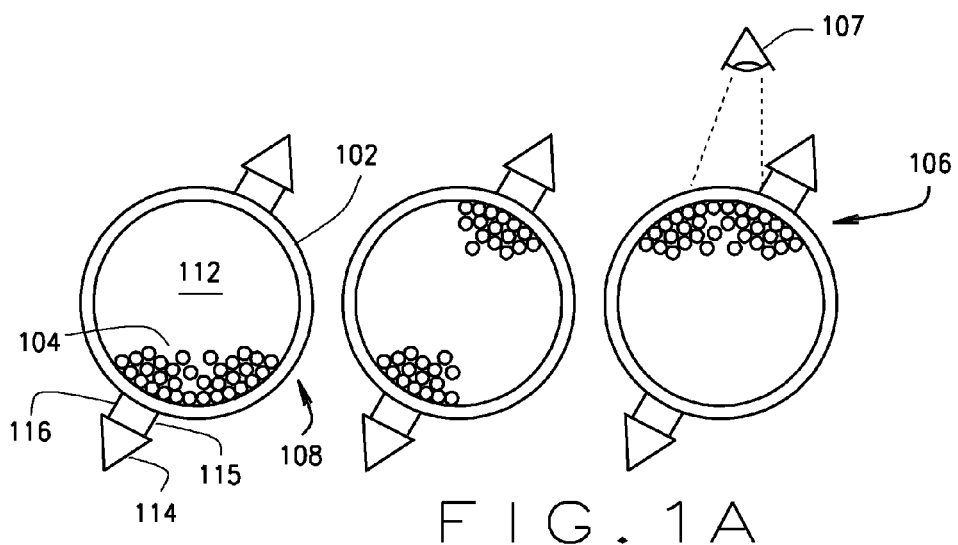
FIG. 1A
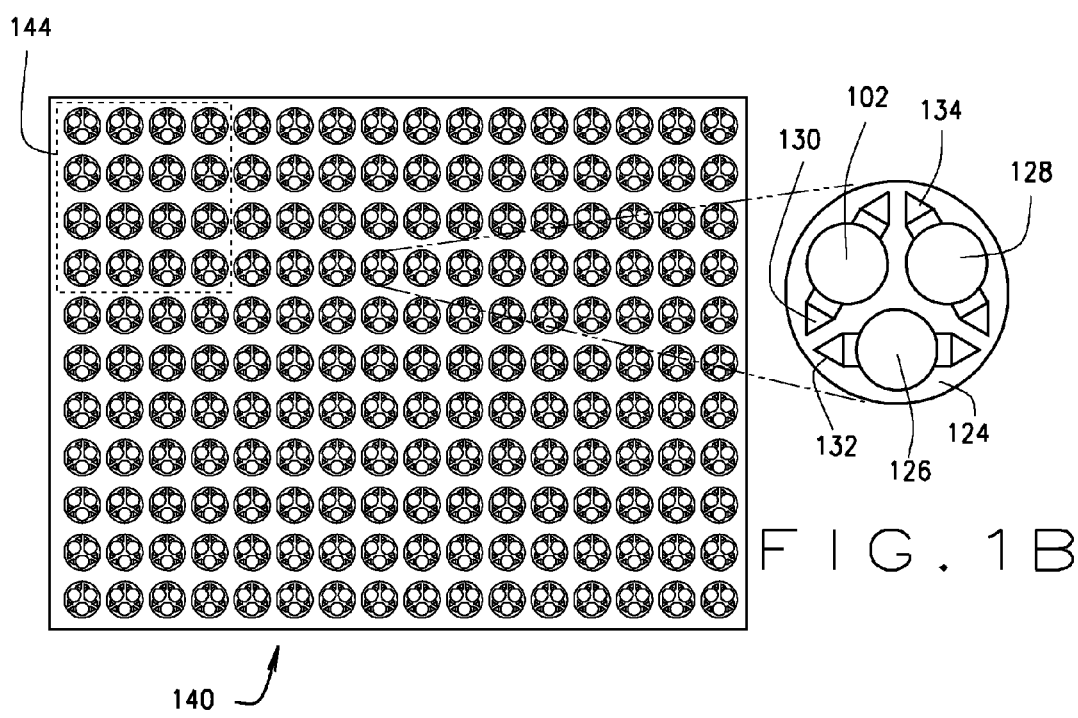
FIG. 1B
FIG. 1C

ACTIVE FINISH SYSTEM FOR PROVIDING AN IMAGE ON A SURFACE

BACKGROUND

1. Field

This disclosure relates generally to displays and, more particularly, to displays provided by reflectance-type particles.

2. Background

Paint on surfaces, particularly on aircraft surfaces, is static and difficult to maintain. There is a desire to reduce weight and cost of maintenance for aircraft finishes and it is recognized that having a dynamic paint finish system would be a desirable advantage. Current systems are not available to provide surface finishes which include a pattern or design that provides a dynamic or changing logo. Conventional e-inks, used in electronic reader devices, which use surface charged particles in a dielectric fluid and require external conductors such as a charged substrate could potentially be used to cause the displayed color change, but would not be practical for the application due to the increased weight and cost of fuel. A system is desired that is dynamic, flexible and maintainable, while practical for the application.

SUMMARY

Flexible active (with active electronics) or passive (externally activated) reflective particle based coatings (or additive) could provide such flexibility as disclosed and claimed herein. Flexible Displays of an Active or passive form could provide a means to avoid painting liveries or color schemes on aircraft and could be structural contributors to saving weight. If external equipment can be used to modify the visual appearance rather than being on-board the technology could further contribute to managing vehicle weight and subsequent fuel and maintenance costs. The technology as disclosed and claimed in this application is an externally activated grouping of charged particles forming a display element (which can be referred to as a pixel) utilized in combination with other elements for providing a changeable image on a surface to provide a display. One implementation can include a first capsule containing a plurality of first reflectance-type charged particles suspended in a dielectric fluid. For switching of the reflectance-type charged particles between a state where the particles are visible to a state where they are not visible, a first rectenna having dipole elements can be attached to the first capsule and conductively coupled to the first capsule to effect switching of the plurality of first reflectance-type charged particles between a substantially visible state to a substantially non-visible state when a signal having the first rectenna's wavelength is received. Each of the reflectance-type charged particle can be configured to reflect a visible predetermined color when switched to the substantially visible state by the potential applied by the rectenna.

In another implementation an outer capsule containing the first capsule and further containing a second capsule and third capsule can be utilized where each of first, second and third capsules can contain a different grouping of reflectance-type charge particles and each different grouping of the first, second and third capsules of charge particles can reflect a different predetermined color, one with respect to another (one embodiment can be a picture element having three color components, i.e. a Tri-Color Picture Element). Each of first, second and third capsules can have respective first, second and third rectenna each having dipole elements attached to the respective first, second and third capsules and conductively coupled to the respective first, second and third capsules to effect switching of the different grouping of reflectance-type charged particles between the substantially visible state to the substantially non-visible state.

Yet another implementation can include a plurality of outer capsules where each of the plurality of outer capsules contain multiple inner capsules where each of the multiple inner capsules contain an inner grouping of reflectance-type charged particles which reflect a predetermined color. Each of the multiple inner capsules can have an inner capsule rectenna having unique frequency dipole elements attached to the inner capsules and conductively coupled to the inner capsule to effect switching of the inner grouping of reflectance-type charged particles between the substantially visible state to the substantially non-visible state when a signal having an inner capsule rectenna wavelength is received by the inner capsule rectenna. Inner capsule rectenna pairs can be used, one for OFF and one for ON, however, one could certainly use a single rectenna for merely initiating a change in state either from OFF to ON or from ON to OFF. Further, an implementation where there are groupings of two or more inner capsules where each grouping operates to generate varying colors or shades of gray can be configured such that each individual inner capsule within the group can each have a separate rectenna for effecting change to the ON state while having a single rectenna controlling and effecting the OFF state for the entire grouping.

When inner capsules are grouped together in groupings of two or more, each capsule can reflect a different color in order to affect a visual color mixing to generate a multi-color display or a display capable of displaying varying shades of gray. For illustration purposes, groupings of five inner capsules per grouping can be used where the capsules reflect various colors including Red, Yellow, Blue, Black and White.

Further, the groupings need not be contained in an outer capsule. Groupings can merely be applied to a substrate where the desired groupings of inner capsules are arranged and affixed to the substrate. Yet another potential implementation is to not have predetermined physical groupings. In one implementation, inner capsules can be suspended in fluid such as a paint where there are various different colors of inner capsules randomly dispersed throughout the fluid. When a surface is painted with the fluid, the inner capsules will be randomly dispersed across the surface with no particular groupings of colors. However due to the size and number of inner capsules dispersed the resolution will be sufficient to have the same effect.

When a capsule containing a plurality of reflectance-type charged particles, whether individually or in groupings within an outer capsule, is suspended in a fluid such as a paint and the paint is applied to a surface, there is a possibility because of the randomness of the distribution during application that the capsules will not have the optimum spatial orientation such that when an individual capsule is turned ON, the orientation may be such that the reflectance-type charged particles are not visible or when it is turned OFF the reflectance-type charged particles are visible or the orientation could be such that the reflectance-type particles are partially visible whether in the ON or OFF state. Therefore one implementation can be to apply the paint to a surface with an electrostatic field applied across the surface such that the capsules or individual elements containing the reflectance-type charged particles will properly align. A DC electrostatic charge can be utilized during the painting process.

Another implementation to address an error in spatial orientation of a capsule is to utilize an image sensing device such as a camera that captures an image of display upon completion of the switching process. The captured image can be analyzed to determine if the capsules in the appropriate areas of the display are properly turned on or left off. The captured image data can be compared against stored image data representative of how the image should appear. In areas where the capsules are incorrectly turned on or left off a signal can be generated to switch the capsules to correct the image. The image sensor can capture images of areas of the display real time as the capsule elements are being switched in a piece meal manner or an image can be captured after the initial pass of switching the capsule elements is complete.

In one implementation a signal generator can be operable to generate and output a plurality of signals including signals having discrete wavelengths that are individually addressable to each inner capsule rectenna of the multiple inner capsules. In yet another implementation a second rectenna having dipole elements can be attached to the first capsule and conductively coupled to the first capsule where the first rectenna when receiving a signal having the first rectenna's wavelength switches the plurality of first reflectance-type charged particles from the non-visible state to the visible state and where the second rectenna when receiving a signal having the second rectenna's wavelength switches the plurality of first reflectance-type charged particles from the visible state to the non-visible state.

One implementation of the system that is in view is a display system of electronically activated charged particles including a plurality of outer capsules where each of the plurality of outer capsules contain multiple inner capsules where each of the multiple inner capsules, contained within each outer capsule, contains an inner grouping of reflectance-type charged particles which each reflect a predetermined color. Each of the multiple inner capsules can have a first inner capsule rectenna having dipole elements attached to the inner capsules and conductively coupled to the inner capsule to effect switching of the inner grouping of reflectance-type charged particles between the substantially visible state to the substantially non-visible state when a signal having an inner capsule rectenna wavelength is received by the inner capsule rectenna.

With yet another implementation, a second inner capsule rectenna having dipole elements can also be attached to the inner capsule and conductively coupled to the inner capsule where the first inner capsule rectenna effects switching of the inner grouping of reflectance-type charged particles to the substantially visible state and the second inner capsule rectenna effects switching of the inner grouping of reflectance-type charged particles to the substantially non-visible state. The plurality of outer capsules can be applied to a surface. In one implementation, the plurality of outer capsules can be dispersed in a clear coating material and the clear coating material can be applied to the surface.

The technology can be implemented as a method for displaying a changeable image on a surface using electronically activated charged colorant elements, which can include steps of transmitting a plurality of predetermined signals of varying wavelengths with an array of transmitter antennas. The method can also include receiving at one or more of a plurality of rectennas, one of the varying wavelength signals for which the one or more of the plurality of rectennas are responsive. An electric potential can be generated from the one or more of the plurality of rectennas when a signal is received for which the one or more of the plurality of rectennas is responsive, where said one or more of the plurality of rectenna is electrically coupled to a capsule containing a plurality of reflectance-type charged particles. The reflectance-type charged particles responsive to the electric potential generated, effects causing the reflectance-type particles to switch between a visible state and a non-visible state.

In one implementation the method can further include the step of generating signals using a signal generator operable to generate multiple discrete wavelength signals corresponding to the wavelengths one or more of the plurality of rectenna. The signals can be pre-programmed to generate a predefined image using the method. The charged reflectance-type particles can reflect one or more colors. The signal generator can be handheld or moved on a machine.

One implementation of the technology can include a method of manufacturing a display element, which can include forming a first capsule and containing within a first capsule a plurality of first reflectance-type charged particles suspended in a dielectric fluid. The method can further include conductively coupling dipole elements of a first rectenna to the first capsule operable to apply a potential through the conductive coupling to effect switching of the plurality of first reflectance-type charged particles between a substantially visible state to a substantially non-visible state when a signal having the first rectenna's wavelength is received.

A signal generator can be operable to generate and output a plurality of signals through an emitting antenna including signals having discrete wavelengths that are individually addressable to each inner capsule rectenna of the multiple inner capsules that can be provided. In one implementation a signal generator controller can have an emitter microantenna (set) or array. The emitter micro-antenna array can be arranged in a two dimensional array or simply a single row of in-line micro antennas. The antenna array can be traversed across the surface having the capsule elements applied there on. As the array passes over the surface, the signal generator can control the emitter micro-antenna emissions to effect the appropriate switching. The emitter micro-antenna array can be tuned to emit any of the OFF or ON frequencies needed to activate the active finish particles. The active finish particles, often simply referred to herein as elements or pixel, can generally be referred to as such because when the particles are applied to a surface as part of a finish, for example a paint finish, they are imbedded in the finish, but they are active in that they can be controlled to change their appearance when switched between an ON and OFF state. The signal generator can work in concert with an integrated image sensor that provides feedback to the controller as to the state of an area of finished surface. The operation for controlling an area is described as, positioning the array of controller antenna(s) over an area, the area is reset, specific colors are set, then the imager confirms the proper result. If an error is made in location, the process recycles. The controller can also scan first and avoid any reset/set cycles if the color is already set correctly. In one implementation of the technology a second rectenna 204 can also be used having dipole elements that can be attached to the first capsule and conductively coupled to the first capsule. When the first rectenna 114 receives a signal having the first rectenna's wavelength it effects switching of the plurality of first reflectance-type charged particles from the non-visible state to the visible state. When the second rectenna receives a signal having the second rectenna's wavelength it effects switching the plurality of first reflectance-type charged particles from the visible state to the non-visible state. The signal generator can be operable to generate and output a plurality of signals including signals having discrete wavelengths for the first and second rectennas.

With one implementation, the technology can include a reflectance-type particle that reacts or changes state responsive to heat input from for example infrared radiation, conduction or another wavelength of RF. As the reflectance-type particle material is subjected to heat from an infrared source, the material can change from a solid to a liquid and/or gas and/or change color and that then condenses and solidifies.

One implementation of the method can also include the step of applying a predetermined color to each of the reflectance-type charged particle to visibly reflect the predetermined color when switched to the substantially visible state. The method can also include, containing in an outer capsule the first capsule and further containing a second capsule and third capsule in the outer capsule where each of first, second and third capsules contain a different grouping of reflectance-type charge particles and each different grouping of reflectance-type charge particles of the first, second and third capsules of charge particles having applied a different predetermined color, one with respect to another for reflecting the different predetermined color. The method can also include conductively coupling dipole elements of first, second and third rectenna respectively to each of first, second and third capsules operable to apply current through the conductive coupling to the respective first, second and third capsules to effect switching of the different grouping of reflectance-type charged particles between the substantially visible state to the substantially non-visible state.

The method can include manufacturing a plurality of outer capsules where each of the plurality of outer capsules contain multiple inner capsules where each of the multiple inner capsules contain an inner grouping of reflectance-type charged particles which reflect a predetermined color, and conductively coupling to each of the multiple inner capsules an inner capsule rectenna by conductively coupling dipole elements to the inner capsules to effect switching of the inner grouping of reflectance-type charged particles between the substantially visible state to the substantially non-visible state when a signal having an inner capsule rectenna wavelength is received by the inner capsule rectenna.

A shape of the outer or inner capsule can be substantially spherical in shape or cone shaped or hour glass shaped or another practical shape. The charged particles can be single color in transparent dielectric or a plurality of colors. Using polarized particles or LCDs is also possible to utilize with rectennas but they often times require continuous energizing. The technology as disclosed herein can also include a combination use of rectenna and other energy techniques to activate or partially activate such as optical or thermal energy techniques. Various materials can be used for various surface effects including camouflage or stealth. The surface effects can be used for advertising, identification/branding, and camouflage.

The technology as disclosed and claimed herein enables a flexible, and a maintainable finish system for a surface such as for the skin of an aircraft (and other applications) that may reduce labor and weight, as well as to provide competitive advantage in enabling high flexibility in finishes. By employing rectenna technology, there is no need to use on-board power source to control the color or design of the finish system as the power required to change the color is provided by an external controller. This can allow for readily changing the finish color without taking a vehicle out of service, reducing downtime and eliminating the use of additional paints and finishes. Electronic capsules containing particles with a rectenna conductively coupled thereto provides a method where a plurality of these electronic capsules can be applied to a surface as a particle finish system that provides a changeable display. The particles are visible by ambient light (e.g., by reflectance) and generally do not luminesce (non self emitting). Energy from an external controller energizes the particle by way of the rectenna to cause an internal molecular change (e.g., conformational or positional) change that would make the particle visible (or not). The dosing of the particles would be determined based on the particular design. For example, if pixilation was not an issue or if finer resolution or fidelity was required the particles could be selected based on the end application. It is envisioned that the rectenna would each have a particular wavelength to control particle, making them addressable.

Combining the aforementioned with active light emitting techniques can make the display visible might and day using electro-luminescent white light, OLED (organic light-emitting diode) individual colors or retransmitting mixed phosphors excited by high energy UV or deep blue light. At such time the particles could provide transmissive filtering or internal multipath reflectance to achieve the desired imaging effect with integrated self-illumination.

The features, functions, and advantages that have been discussed can be achieved independently in various embodiments or may be combined in yet other embodiments further details of which can be seen with reference to the following description and drawings.

These and other advantageous features of the present technology as disclosed and claimed herein will be in part apparent and in part pointed out herein below.

BRIEF DESCRIPTION OF THE DRAWINGS

For a better understanding of the present technology as disclosed and claimed herein, reference may be made to the accompanying drawings in which:

FIG. 1A is an illustration of a regular array of active finish particles applied to a surface;

FIG. 1B is an illustration of multiple inner capsules within and outer capsule forming a grouping;

FIG. 1C is an illustration of a regular array of active finish particles arranged in groupings.

Figure 2:
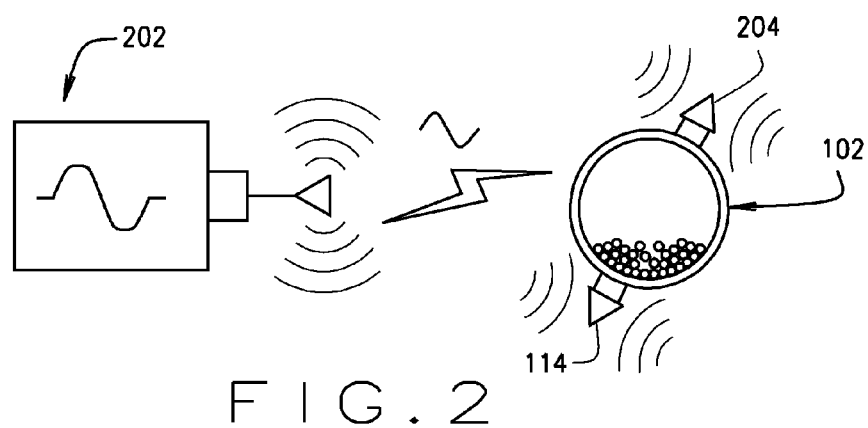
FIG. 2 is an illustration of a signal generator controller that has an emitter micro-antenna (set)
Figure 3:
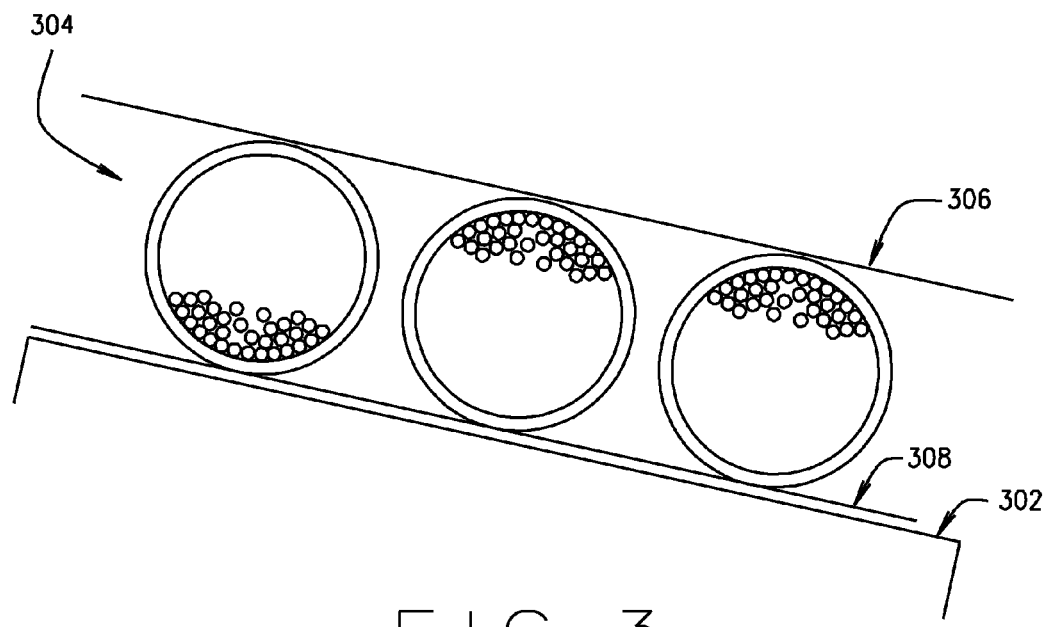
FIG. 3 is an illustration of an edgewise view of the active finish tri-node. Each color element is shown in cutaway view to have colored reflective particles at the visible surface (on) or away from the visible surface (off)

While the technology as disclosed and claimed herein is susceptible to various modifications and alternative forms, specific implementations thereof are shown by way of example in the drawings and will herein be described in detail. It should be understood, however, that the drawings and detailed description presented herein are not intended to limit the invention to the particular implementation disclosed, but on the contrary, the intention is to cover all modifications, equivalents, and alternatives falling within the spirit and scope of the present invention as defined by the appended claims.

DESCRIPTION

According to the implementation(s) of the present technology as disclosed herein, various views are illustrated in FIG. 1-4 and like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

One embodiment of the present technology comprising a plurality of switchable elements teaches a novel apparatus and method for providing a display on the surface.

The details of the present technology as disclosed and various implementations can be better understood by referring to the figures of the drawing. Referring to FIG. 1, each of the capsules 102 can contain a plurality of reflectance-type particles 104. The particles can have a composition such that the reflectance-type particles transition between a visible and a non-visible state when induced by an input such as input from an electrical, thermal, chemical and/or other energy source. The transition from visible to non-visible states can be effected by positionally transitioning the reflectance-type particles between a position where they are visible 106 from a viewing perspective 107 and a position where they are non-visible 108 from the viewing perspective. The transition from visible to non-visible states can be effected by a change in the composition or other characteristic of the reflectance-type material that effects the ability to see the reflectance-type particles. A plurality of these capsules can be applied to a surface one adjacent to the other to essentially form the pixels of a display. The reflectance-type particle can appear black or various shades of gray or a predetermined color when view by the human eye. A uniform array of the particles can be applied to a surface, for example the exterior skin of an aircraft. Once an array of particles is applied to a surface, they can then be independently addressable to effect transition between visible and non-visible states or collectively with sufficient resolution to achieve the desire contrast.

One implementation of the technology as disclosed and claimed herein is an electronically activated grouping of charged particles for providing a changeable image on a surface. A first capsule 102 containing a plurality of first reflectance-type charged particles can be suspended in a dielectric fluid 112. The technology can also include, a first rectenna 114 having dipole elements 115 and 116 attached to the first capsule and conductively coupled to the first capsule to effect switching of the plurality of first reflectance-type charged particles between a substantially visible state 106 to a substantially non-visible state 108 when a signal or input having the first rectenna's wavelength is received and the rectenna there by induces an electrical current.

The grouping of charged particles as contained in the capsule can have a charge to effect movement when the grouping of charged particles are in the presence of an opposite charge to thereby cause each of the reflectance-type charged particles to move to a position where they are more visible from a given perspective by reflecting a visible predetermined color when switched to the visible position by the opposite charge which can be referred to as switching to a substantially visible state.

The capsules can be singular and monochromatic or they can be grouped together by two or more, where each of the reflectance-type particle groupings can each have a different color or shade of gray to thereby affect color mixing similar to that seen in LCD color monitors. With this implementation, the grouping of charged particles as described can have an outer capsule 124 containing the first capsule 102 and further containing a second capsule 126 and third capsule 128 where each of first, second and third capsules contain a different grouping of reflectance-type charge particles and each different grouping of the first, second and third capsules of charge particles reflects a different predetermined color, one with respect to another, and each of the first, second and third capsules can have respective first, second and third rectenna 130, 132, and 134 each having dipole elements attached to the respective first, second and third capsules and conductively coupled to the respective first, second and third capsules to effect switching of the different grouping of reflectance-type charged particles between the substantially visible state to the substantially non-visible state. When the rectenna receives an RF signal at its wavelength the rectenna will induce an electric potential. A rectenna is special type of antenna that is used to convert radio frequency energy into direct current electricity. They can be used as a wireless power transmission system that transmits power by radio wave. This wireless system allows the power source and signal generator to be remote with respect to the array of display elements.

Therefore, if an array of elements 140 are applied to the skin of an aircraft, the weight of the power source can be excluded from the weight of the aircraft. A simple rectenna element consists of a dipole antenna with an RF diode connected across the dipole elements. The diode rectifies the AC current induced in the antenna by the microwaves, to produce DC power, which powers a load connected across the diode. This can be used to induce a charge having opposite polarity to that of the charged reflectance-type particles to thereby drive the particles to the opposing side of the capsule. In this implementation, the grouping of reflectance-type charged particles positionally can shift between a non-visible position 108 within the capsule on the most distal side of the capsule with respect to the viewing position 107 or perspective, and a visible position 106 within the capsule on the most near side of the capsule with respect to the viewing perspective 107.

A plurality of outer capsules can be uniformly applied to a surface creating an array of elements 140 where each of the plurality of outer capsules can contain multiple inner capsules where each of the multiple inner capsules contain an inner grouping of reflectance-type charged particles which reflect a predetermined color. Each of the multiple inner capsules can have an inner capsule rectenna having dipole elements attached to the inner capsules and conductively coupled to the inner capsule to effect switching of the inner grouping of reflectance-type charged particles between the substantially visible state to the substantially non-visible state when a signal having an inner capsule rectenna wavelength is received by the inner capsule rectenna. The reflectance-charged particles are responsive when subjected to an opposite charge causing them to move toward the opposite charge. The reflectance-type charged particles can be controlled by area as indicated by 144. Once control of an area has been effected, the adjacent areas can be controlled until the entirety of the array is completed.

Referring to FIG. 2, a signal generator 202 operable to generate and output a plurality of signals including signals having discrete wavelengths that are individually addressable to each inner capsule rectenna of the multiple inner capsules can be provided. A signal generator controller is illustrated that has an emitter micro-antenna (set). The emitter micro-antenna is tuned to emit any of the OFF or ON frequencies needed to activate the active finish particles. The signal generator works in concert with an integrated imaging sensor that provides feedback to the controller as to the state of an area of finished surface. The operation for controlling an area is described as, positioning the controller antenna(s) over an area 144, the area is reset, specific colors are set, then the imager confirms the proper result. The imager can be a camera or other image sensing device. If an error is made in location, the process recycles. The controller can also scan first and avoid any reset/set cycles if the color is already set correctly. In one implementation of the technology a second rectenna 204 can also be used having dipole elements that can be attached to the first capsule and conductively coupled to the first capsule. When the first rectenna 114 receives a signal having the first rectenna's wavelength it effects switching of the plurality of first reflectance-type charged particles from the non-visible state to the visible state. When the second rectenna receives a signal having the second rectenna's wavelength it effects switching the plurality of first reflectance-type charged particles from the visible state to the non-visible state. The signal generator can be operable to generate and output a plurality of signals including signals having discrete wavelengths for the first and second rectennas.

In yet another implementation of the technology the first capsule can contain a plurality of second reflectance-type charged particles suspended in the dielectric fluid and having properties to reflect light of a color different from that of the first reflectance-type charged particles and having an opposite charge with respect to the charge of the first reflectance-type charged particles. The color of these particles can be similar to the color of the surface on which it is being applied. This will allow for blanking of the display elements such that the first reflectance-type charged particles are completely non-visible from the perspective of a viewer.

The first capsule 102 can be applied to a surface 302 adjacent other capsules. The first capsule is suspended in a clear material 304 and the clear material is applied to the surface. The clear coating material can be a clear paint or epoxy or other clear coating that can be applied to a surface. In one implementation, the clear material can be a multi-ply film with the outer capsules positioned between ply 306 and ply 308 and the multi-ply film can have at least one side of the film 308 adapted to adhere to the surface 302. If the smart particles are suspended in paint, the particles if appropriately sized can provide a textured surface for example it could be designed to mimic shark skin that has small bumps that like a golf ball to make the surface less drag inducing.

One implementation of the display system of electronically activated charged particles includes a plurality of outer capsules where each of the plurality of outer capsules contain multiple inner capsules where each of the multiple inner capsules, contained within each outer capsule, contains an inner grouping of reflectance-type charged particles which each reflect a predetermined color. Refer to FIG. 1C. Referring to FIG. 1B, each of the multiple inner capsules 102, 126 and 128 can have a first inner capsule rectenna 102, 132 and 134 having dipole elements attached to the inner capsules and conductively coupled to the inner capsule to effect switching of the inner grouping of reflectance-type charged particles between the substantially visible state to the substantially non-visible state when a signal having an inner capsule rectenna wavelength is received by the inner capsule rectenna. In one implementation, a second inner capsule rectenna having dipole elements attached to the inner capsules and conductively coupled to the inner capsule can be utilized where the first inner capsule rectenna effects switching of the inner grouping of reflectance-type charged particles to the substantially visible state and the second inner capsule rectenna effects switching of the inner grouping of reflectance-type charged particles to the substantially non-visible state. The plurality of outer capsules 124 are applied to a surface 140 as seen in FIG. 1C. As with the mono-chromatic configuration with mono-chromatic capsules, the plurality of outer capsules can be dispersed in a clear coating material and the clear coating material can be applied to a surface. As with the monochromatic system, the clear coating material can a clear paint and can be painted on the surface in a uniform manner. In yet another implementation the clear coating material can be a multi-ply film with the outer capsules positioned between plies and the multi-ply film having at least one side of the film adapted to adhere to the surface.

The display system created by applying a plurality of outer capsules to a surface can be implemented such that the first and second rectennas of each of the multiple inner capsules within the outer capsule have individually addressable discrete wavelengths for which the first and second rectennas of each of the multiple inner capsules will respond. The more individually addressable the inner capsules are, the higher the resolution that can be achieved. The outer capsules 124 and inner capsules 102, 126 and 128 can be micro- or even nano-meter sized in diameter. The first 114 and second 204 rectennas of each of the multiple inner capsules can be operable to receive their respective individually addressable discrete wavelengths from a signal generator and to be responsive to receipt of their respective individually addressable discrete wavelengths and to apply a current to effect switching of the inner grouping of reflectance-type charged particles between the substantially visible state to the substantially non-visible state.

Figure 4:
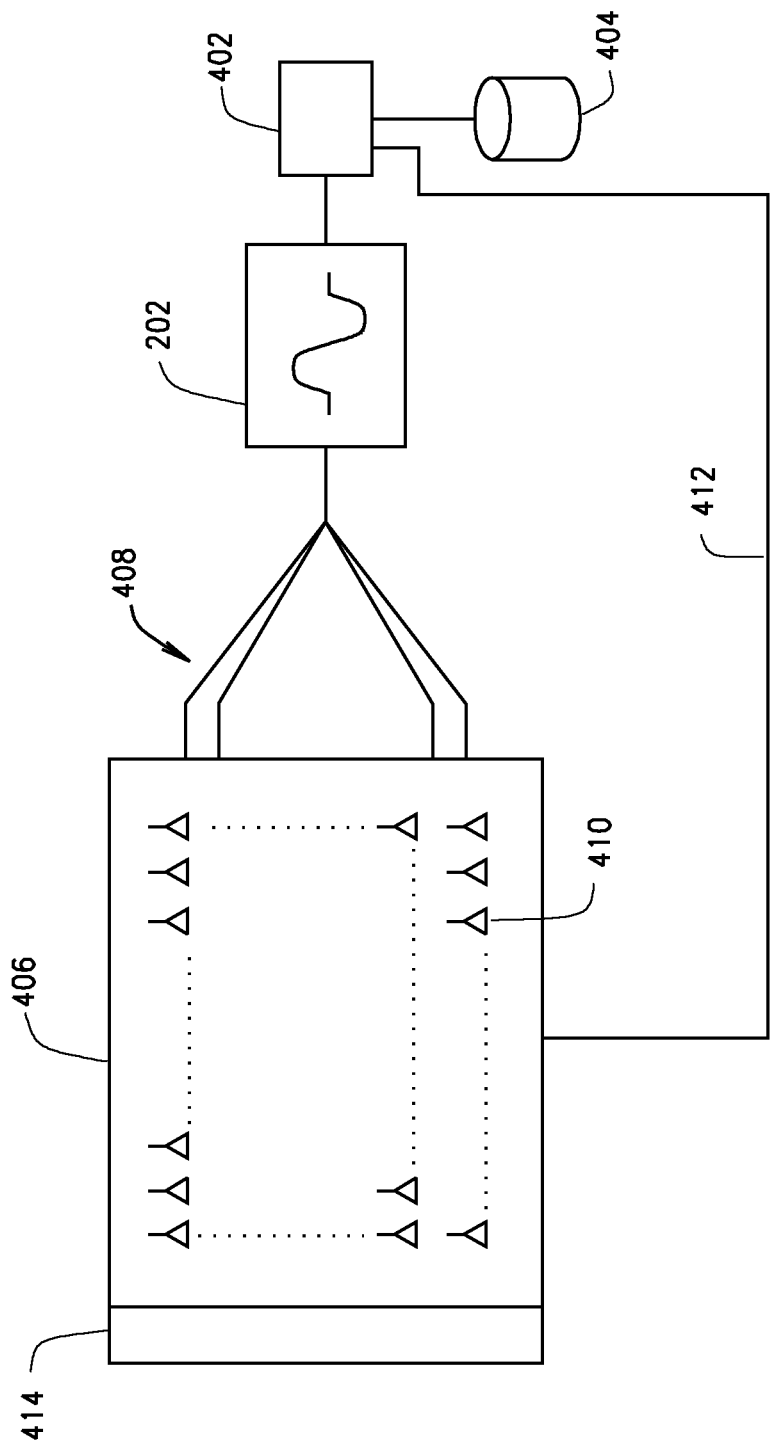
FIG. 4 is an illustration of a signal generator controller that has an emitter micro-antenna array.

Referring to FIG. 4, the signal generator 202 can be operable to generate multiple of the individually addressable discrete wavelength signals corresponding to the first and second rectennas of each of the multiple inner capsules having individually addressable discrete wavelengths. The signal generator can include a programmable controller or computing device 402 coupled to a memory 404 having computer executable instructions where when executed, the controller or other computing device can control the signal generator to transmit separate signals through each of the transmitter antennas to selectively energize the first and second rectennas of each of the multiple inner capsules with their respective wavelengths for changing an image displayed by the plurality of outer capsules. The signal generator can have a plurality of discrete outputs 408 communicably linked to drive a plurality of transmitter antennas 410 arranged in an array 406. The transmitter antennas can be similarly sized as the rectennas coupled to the plurality of capsules containing the reflectance-type charged particles. The transmitter antennas can also be similarly arranged in an array similar to the array of capsules applied to the surface. To initiate communication between the transmitting antennas and the rectennas, the array of transmitting antennas can be placed in close proximity to the surface on which the capsules are applied and the array of transmitting antennas can be traversed hovering over the surface in close proximity to the surface.

The traversing of the array of antennas can have a predetermined starting point or area 144. For example, for a display configured with a rectangular array of capsules, see FIG. 1C, the traversing of the array of transmitting antennas can begin in the upper left corner area 144 of the rectangular array of capsules. The array of transmitting antennas can then be traversed left to right or in any other appropriate direction until the entirety of the array of capsules has been covered and interfaced with. The controller or other computing device can control the discrete signals being transmitted by each of the transmitting antennas as they traverse over the surface of the display. The array of antennas can be communicably linked 412 to the controller to provide position information. The start position can be registered by the controller and continuously tracked by controller as the array of transmitting antennas traverses over the surface. A sensor 414 can be used to register the start position as well as track the position of the array of transmitting antennas as they transverse over the surface. The sensor can be a camera, a positional sensor, whether optical, electronic or otherwise. As the array of transmitting antennas traverses over the surface on which the display is applied or after the array has traversed over the entirety of the display surface, the sensor system can also be used to determine if the individually addressable capsules are in the appropriate state.

For example, a camera could be used to capture an image of the individual elements and the image can be analyzed by the programmable controller or computing device 402 to compare the captured image data with data representative of how the image should appear if the elements of the display have been appropriately switched. The sensor 414 (which can be a camera or other sensing device) can be adjacent the array of antennas and positioned along the trailing edge of the array of transmitting antennas and can capture an image the display elements over which the transmitting antennas have already traversed. The image data can be communicated by 412 (hardwire or wireless communication) and analyzed by the programmable controller or computing device 402 to determine if the elements have been appropriately switched. If errors are detected by the computing device 402 when conducting the analysis of the image data, an error message can be output by the computing device indicating that a repass of the transmitting antennas is required and the process can be repeated. In one implementation, the computing device 402 can perform an analysis of the communicated image data by comparing the communicated image data with stored image data. The camera or other sensor can also be remote with respect to the array of transmitting antennas and positioned with a field of view to capture the entirety of the display area at once. The array of antennas can be traversed over the surface using a mechanical robotic arm or can be manually traversed.

A camera can be utilized that is integrated with a mobile device (or robot) that enables a display illustration to be provided as a feedback mechanism to adjust the on/off position of each color/pixel. The camera can capture a real-time image of the graphic representation presented by the display and the captured image can be analyzed to determine if the graphic being presented is correct or if further correction is required.

If a color display system is desired, the reflected predetermined color of each of the multiple inner capsules can include at least red, green and blue. The method for displaying a changeable image on a surface using electronically activated charged colorant elements can include transmitting a plurality of predetermined signals of varying wavelengths with an array of transmitter antennas. The method can further include receiving at one or more of a plurality of rectennas one of the varying wavelength signals for which the one or more of the plurality of rectennas are responsive. The rectennas can perform generating an electric potential from the one or more of the plurality of rectennas when a signal is received for which the one or more of the plurality of rectennas is responsive, where said one or more of the plurality of rectenna is electrically coupled to a capsule containing a plurality of reflectance-type charged particles.

Responsive to the electric potential generated, a step can be performed causing the reflectance-type particles to switch between a visible state and a non-visible state. Yet another step can be generating signals using a signal generator operable to generate multiple discrete wavelength signals corresponding to the wavelengths one or more of the plurality of rectenna. The signals can be pre-programmed to generate a predefined image using the method. The charged reflectance-type particles reflect one or more colors, therefore a full color image can be produced by generating multiple discrete wavelength signals using the micro-antennas of the array. The reflectance-type particles are caused to switch between a visible state and a non-visible state by passing the array of micro-antennas over a surface having the capsules applied thereon where the array of micro-antennas are generating signals driven by a signal generator.

However, the switching need not be implemented using an array of antennas passing over the surface. The RF discrete signals having the wavelengths of the individually addressable rectennas can be generated remotely from the surface and the individual discrete signals can be generated in parallel or serially. The signal provided for effecting the transition of the particles between visible and non-visible can be RF, but can also be an intense light source such as laser light or could be an infrared signal. So the spectrum might get into the range of light, and not required to be specifically RF. The activator could be an intense light source like a laser array selectively scanning the aircraft or surface targeted for an image.

It should be noted, however, that the technology can be implemented using the rectennas as a power source without using electrically charged reflectance-type particles. The electronic elements or capsules can contain a gas or other material that is responsive to energy being supplied by the rectenna, where the gas or other material changes what color of light or whether or not visual light is reflected at all responsive to the energy be supplied by the rectennas. As it relates to the reflectance-type charged particle, a method for manufacturing a display element can include, containing within a first capsule a plurality of first reflectance-type charged particles and suspending the charged particles in a dielectric fluid. The process of manufacture further includes conductively coupling dipole elements of a first rectenna to the first capsule operable to apply a current through the conductive coupling to effect switching of the plurality of first reflectance-type charged particles between a substantially visible state to a substantially non-visible state when a signal having the first rectenna's wavelength is received.

A predetermined color for each of the reflectance-type charged particle such that they visibly reflect the predetermined color when switched to the substantially visible state. For multi-color the manufacturing process can include containing in an outer capsule the first capsule and further containing a second capsule and third capsule in the outer capsule where each of first, second and third capsules contain a different grouping of reflectance-type charge particles and each different grouping of reflectance-type charge particles of the first, second and third capsules of charge particles having applied a different predetermined color, one with respect to another for reflecting the different predetermined color. The manufacturing process can include conductively coupling dipole elements of first, second and third rectenna respectively to each of first, second and third capsules operable to apply current through the conductive coupling to the respective first, second and third capsules to effect switching of the different grouping of reflectance-type charged particles between the substantially visible state to the substantially non-visible state.

The array for the display can be created by manufacturing a plurality of outer capsules where each of the plurality of outer capsules contain multiple inner capsules where each of the multiple inner capsules contain an inner grouping of reflectance-type charged particles which reflect a predetermined color. Again, the process can include conductively coupling to each of the multiple inner capsules an inner capsule rectenna by conductively coupling dipole elements to the inner capsules to effect switching of the inner grouping of reflectance-type charged particles between the substantially visible state to the substantially non-visible state when a signal having an inner capsule rectenna wavelength is received by the inner capsule rectenna.

A reflectance-type particle contained in a capsule having a rectenna attached to provide the switching means enables the desired flexibility and maintainability, while providing an energy advantage. This solution differs from conventional e-ink displays used in e-readers because it does not require additional power from the substrate. Each particle carries its own conductor and can cause the particle to move closer toward or away from the surface. The technology is not generally self-emitting, but a "backlight" illumination could be provided, if desired. Current displays typically rely on an upper and lower conductor grid (electrodes) to affect the image display. Once pluralities of smart particles are applied to a surface, the present particles would be powered when activated/inactivated by an external controller device (e.g., smart phone or other computing device) and an array of emitting antennas.

This technology can be used for example as an aircraft active electronic finish which could be implemented in any one of several ways. The particles could be integrated into the initial construction or applied in fabrication as a finish layer printed or with robotic applicators (arms or vacuum attached crawlers), or can be applied as a bonded appliqué (applied then heat or laser treated in place). Ruggedness can be addressed by using nanomaterials such as Carbon Nanotubes or Transparent Aluminum coatings or integrated substrates can be utilized. The technology can be applied such that there are repairable and replaceable sections. Off-board collaborative electronics can be utilized to drive the appearance and then be left on the ground. For dynamic, active real-time operation, networked nodes integrated in the structure in highly distributed fashion can be utilized such as Node based approaches that are less dense, Fiber optic control channels embedded in the aircraft structure, Embedded CNT (carbon nanotube) conductors in the structure, Wireless networks, and Collaborative ground systems that interact with the aircraft to change the displayed data. A means may also be provided such that the smart particles can retain a charge induced by the rectenna.

An electronic particle layer can be a flexible sheet that is sandwiched between a thin composite backing and a thin layer of transparent aluminum coating for ruggedness. The entire "tile" can be flexible enough to conform to and be bonded to the contours of a surface such as an aircraft skin. The electronics to change the particle displayed data can be external and accessed with one or many integrated inductive data transfer coils (provides power and signal) so that minimal driver electronics (if any) are needed internal to the tile. A user who has a smart phone with an accessory module can enable the display to change appearance. The smart phone could be integrated with a robotic arm or crawler having an array of transmitting antennas to activate the change to the display. The equipment could modify the state and not be onboard at all times, further managing weight.

Many alternative implementations exist. Real-time change is possible by integrating the electronics into a vehicle's surface. The elements in the tile or surface, in this instantiation, provide the display and minimal electronics that are needed to convert an inductive modulated signal into a change in color. The particles can use internal molecular changes to cause migration of the molecular elements, making them visible or not. The dosing of each microcapsule is design dependent. Particle size will be dependent upon desired fidelity of resolution and application specific. Each rectenna can have a certain wavelength, e.g. it would respond to for on (visible) or off (not visible). A simple tile side approach can be utilized where each pixel color dot can have 2 micro-antennas that receive only one frequency of inductive energy each. The presence of one frequency turns that color 'on' and the presence of the other turns it 'off'. For example, a three-color system would need six discrete wavelengths to control, see FIG. 1B. The only function of this tile is to provide display and self protection with secure bonding to the underlying structure, though more structural integration is probable to make the technique multifunction.

The various implementations and examples shown above illustrate a method and system for a display on a surface. A user of the present method and system may choose any of the above implementations, or an equivalent thereof, depending upon the desired application. In this regard, it is recognized that various forms of the subject display method and system could be utilized without departing from the spirit and scope of the present implementation.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present implementation. Accordingly, the specification and drawings are to be regarded in an illustrative rather than a restrictive sense.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled. The inventive subject matter may be represented in a variety of different implementations of which there are many possible permutations.

The methods described herein do not have to be executed in the order described, or in any particular order. Moreover, various activities described with respect to the methods identified herein can be executed in serial or parallel fashion. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

Any computer, controller or client-server machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine or computing device. Further, while only a single machine is illustrated, the term "machine" shall also be taken to include any collection of machines that individually or jointly execute a set (or multiple sets) of instructions to perform any one or more of the methodologies discussed herein.

A computer system can include a processor (e.g., a central processing unit (CPU) a graphics processing unit (GPU) or both), a main memory and a static memory, which communicate with each other via a bus. The computer system may further include a video/graphical display unit (e.g., a liquid crystal display (LCD) or a cathode ray tube (CRT)). The computer system and client computing devices can also include an alphanumeric input device (e.g., a keyboard), a cursor control device (e.g., a mouse), a drive unit, a signal generation device (e.g., a speaker) and a network interface device.

The drive unit includes a computer-readable medium on which is stored one or more sets of instructions (e.g., software) embodying any one or more of the methodologies or systems described herein. The software may also reside, completely or at least partially, within the main memory and/or within the processor during execution thereof by the computer system, the main memory and the processor also constituting computer-readable media. The software may further be transmitted or received over a network via the network interface device.

The term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present implementation. The term "computer-readable medium" shall accordingly be taken to include, but not be limited to, solid-state memories, and optical media, and magnetic media.

The various smart particle display examples shown above illustrate a system and method for providing a flexible and maintainable graphic on a surface. A user of the present technology as disclosed herein may choose any of the above implementations, or an equivalent thereof, depending upon the desired application. In this regard, it is recognized that various forms of the subject smart particle display could be utilized without departing from the spirit and scope of the present technology as disclosed.

As is evident from the foregoing description, certain aspects of the present technology as disclosed herein are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present technology as disclosed herein.

Other aspects, objects and advantages of the present technology as disclosed herein can be obtained from a study of the drawings, the disclosure and the appended claims.

What is claimed is:

1. A system for providing a changeable image on a surface, the system comprising:
    a plurality of capsules containing respective groupings of reflectance-type charged particles suspended in a dielectric fluid; and
    a plurality of rectennas respectively attached to the plurality of capsules, wherein:
        the plurality of rectennas have respective wavelengths addressable to individual capsules of the plurality of capsules;
        the plurality of rectennas conductively couple to a plurality of dipole elements; and
        a first capsule of the plurality of capsules contains a first grouping of reflectance-type charged particles of the groupings of reflectance-type charged particles;
        the first capsule is attached to a first rectenna of the plurality of rectennas and a first dipole of the plurality of dipoles; and
        the first dipole is configured to switch the first grouping of reflectance-type charged particles from a substantially visible state to a substantially non-visible state in response to the first rectenna receiving a signal having the wavelength of the first rectenna.

2. The system of claim 1, wherein the first grouping of reflectance-type charged particles reflects a visible predetermined color when switched to the substantially visible state.

3. The system of claim 2, comprising an outer capsule containing the first capsule and further containing a second capsule of the plurality of capsules and a third capsule of the plurality of capsules, wherein:
    the first, second and third capsules contain different groupings of reflectance-type charged particles of the groupings of reflectance-type charged particles, and
    the different groupings of the first, second and third capsules reflect different predetermined colors with respect to one another; and
    each of first, second and third capsules are configured to switch the different groupings of reflectance-type charged particles between the substantially visible state and the substantially non-visible state.

4. The system of claim 2, comprising:
    a plurality of outer capsules, wherein:
        each of the plurality of outer capsules contain more than one of the plurality of capsules;
        each of the more than one of the plurality of capsules is configured to reflect a predetermined color; and
        each of the more than one of the plurality of capsules is configured to switch between the substantially visible state and the substantially non-visible state.

5. The system of claim 4, comprising a signal generator operable to generate and output a plurality of signals including signals having discrete wavelengths that are individually addressable to each inner capsule rectenna of the multiple inner capsules.

6. The system of claim 1, comprising a second rectenna of the plurality of rectennas conductively coupled to the first capsule, wherein:
    the first rectenna, in response to receiving a signal having the wavelength of the first rectenna, is configured to switch the first grouping of reflectance-type charged particles from the non-visible state to the visible state; and
    the second rectenna, in response to receiving a second signal having the wavelength of the second rectenna is configured to switch the first grouping of reflectance-type charged particles from the visible state to the non-visible state.

7. The system of claim 6, comprising a signal generator operable to generate and output a plurality of signals including signals having the wavelength of the first rectenna and the wavelength of the second rectenna.

8. The system of claim 1, where the plurality of capsules are applied to the surface.

9. A display system of electronically activated charged particles comprising a plurality of outer capsules respectively containing a plurality of inner capsules, wherein:
the plurality of inner capsules respectively contain groupings of reflectance-type charged particles configured to reflect predetermined colors,
the plurality of inner capsules attach to a respective plurality of first inner capsule rectennas addressable to individual inner capsules of the plurality of inner capsules,
the plurality of inner capsule rectennas have respective wavelengths addressable to individual inner capsules of the plurality of inner capsules;
the plurality of inner capsule rectennas conductively couple to a plurality of dipole elements;
a first inner capsule of the plurality of inner capsules contains a first grouping of reflectance-type charged particles of the groupings of reflectance-type charged particles;
the first inner capsule is attached to a first inner capsule rectenna of the plurality of inner capsule rectennas and a first dipole element of the plurality of dipole elements; and
the first dipole element is configured to switch the first grouping of reflectance-type charged particles from a substantially visible state to a substantially non-visible state in response to the first inner capsule rectenna receiving a signal having the respective wavelength of the inner capsule rectenna.

10. The display system as recited in claim 9, comprising a second inner capsule rectenna of the plurality of inner capsule rectennas conductively coupled to the first inner capsule, wherein:
the first inner capsule rectenna is configured to switch the first grouping of reflectance-type charged particles to the substantially visible state, and
the second inner capsule rectenna is configured to switch the first grouping of reflectance-type charged particles to the substantially non-visible state.

11. The display system as recited in claim 10, where the plurality of outer capsules is applied to a surface.

12. The display system as recited in claim 11, where the plurality of outer capsules are dispersed in a clear material and the clear material is applied to the surface.

13. The display system as recited in claim 9, further comprising a signal generator that is separate and remote with respect to the plurality of outer capsules, the signal generator being configured to switch the inner grouping of reflectance-type charged particles between the substantially visible state and the substantially non-visible state.

14. The display system as recited in claim 13, comprising:
said signal generator operable to generate multiple of the individually addressable discrete radio frequency (RF) signals having respective wavelengths corresponding to the first and second rectennas of each of the multiple inner capsules having individually addressable discrete wavelengths; and
a programmable controller coupled to a memory having computer executable instructions where when executed the controller can control the signal generator to transmit separate RF signals through each of the transmitter antennas to selectively energize the first and second rectennas of each of the multiple inner capsules with their respective wavelengths for changing an image displayed by the plurality of outer capsules.

15. The display system as recited in claim 11, where the reflected predetermined color of each of the multiple inner capsules includes at least red, green and blue.

16. A method of manufacturing a display element comprising:
containing within a plurality of capsules respective groupings of reflectance-type charged particles suspended in a dielectric fluid;
attaching a plurality of rectennas respectively to the plurality of capsules, the plurality of rectennas having respective wavelengths addressable to individual capsules of the plurality of capsules; and
conductively connecting a plurality of dipole elements with the plurality of rectennas, each of the plurality of dipole elements being configured to switch a respective one of the groupings of reflectance-type charged particles from a substantially visible state to a substantially non-visible state in response to receiving a signal having the wavelength of the respective one of the plurality of rectennas.

17. The method as recited in claim 16, comprising applying a predetermined color to each of the reflectance-type charged particle to visibly reflect the predetermined color when switched to the substantially visible state.

18. The method as recited in claim 17, comprising containing in an outer capsule the first capsule and further containing a second capsule and third capsule in the outer capsule, wherein:
each of first, second and third capsules contain different groupings of reflectance-type charged particles of the groupings of reflectance-type charged particles, and
the different groupings of reflectance-type charged particles of the first, second and third capsules have a different predetermined colors with respect to one another for reflecting the different predetermined color; and
each of first, second and third capsules is configured to switch the different groupings of reflectance-type charged particles between the substantially visible state and the substantially nonvisible state.

19. The method as recited in claim 18, comprising manufacturing a plurality of outer capsules, wherein:
each of the plurality of outer capsules contain more than one of the plurality of capsules;
each of the more than one of the plurality of capsules is configured to reflect a predetermined color; and
each of the multiple inner capsules is configured to switch between the substantially visible state and the substantially non-visible state.

* * * * *